Patented Apr. 27, 1954

2,676,992

UNITED STATES PATENT OFFICE 2,676,992

METHOD OF MAKING VITAMIN A AND INTERMEDIATES FORMED THEREBY

Wilbert J. Humphlett, Rochester, N. Y., assignor to Eastman Kodak Company, Rochester, N. Y., a corporation of New Jersey No Drawing. Application September 11, 1951, Serial No. 246,170

7 Claims. (Cl. 260—598)

This invention relates to methods of synthesizing vitamin A and to intermediates formed in such syntheses.

The successful synthesis of vitamin A depends upon the right combination of steps which yield vitamin A, out of the myriad possible combinations and permutations of innumerable potential reactions in the field of organic syntheses. The synthesis of vitamin A is complicated by the complexity and specific nature of the vitamin A molecular structure necessary for vitamin A activity, and by the inherent instability of vitamin A intermediates with a consequent tendency to decompose, isomerize, and/or undergo undesirable side reactions. For example, incomplete conjugation of the polyene linkages, or saturation of one or more of the polyene linkages, or introduction of an additional chain substituent group other than on the terminal carbon atom defeats the successful synthesis of vitamin A by formation of material largely devoid of vitamin A activity.

It is accordingly an object of this invention to provide a new method of synthesizing vitamin A in good yield.

It is also an object of this invention to provide a new combination of method steps employing particular reactants which combine to produce vitamin A.

Another object of the invention is to provide an improved method of synthesizing vitamin A without the objectionable yield losses due to isomerization, side reactions and the like normally attendant to vitamin A syntheses.

Another object of the invention is to provide a new method of converting the aldehyde, 2-methyl - 4 - (2,6,6-trimethyl cyclohex-1-enyl)-buta-2-ene-1-al to vitamin A-active material.

Another object of the invention is to provide new and useful vitamin A intermediates.

Another object of the invention is to provide a new method of synthesizing vitamin A through a diol and including steps which effectively obviate the undesirable effects normally attendant to dehydration of a diol.

Other objects will be apparent from the description and claims which follow.

These and other objects of the invention are attained by processes embodying this invention and comprising condensing an acetal of acetoacetaldehyde with acetylene and thereby forming an acetylenic carbinol, condensing the acetylenic carbinol with the aldehyde, 2-methyl-4 - (2,6,6 - trimethyl cyclohex - 1-enyl)-buta-2-ene-1-al, and thereby forming an acetylenic 3,6- diol acetal, hydrogenating such acetylenic 3,6-diol acetal to the corresponding olefinic 3,6-diol acetal, and converting the olefinic 3,6-diol acetal to vitamin A-active material, the converting including dehydrating the olefinic 3,6-diol acetal. In a preferred embodiment of the invention, the olefinic 3,6-diol acetal is converted to vitamin A alcohol by first converting it to vitamin A aldehyde and reducing the vitamin A aldehyde to vitamin A alcohol. The conversion to vitamin A aldehyde comprises subjecting the olefinic 3,6-diol acetal to dehydration, hydrolysis and treatment with a basic catalyst either simultaneously or sequentially as described more fully hereinafter. The reduction of vitamin A aldehyde to vitamin A alcohol is readily effected by means of an ether-soluble metal hydride or by means of an aluminum alkoxide and a monohydric alcohol or by a similar process for reducing olefinic aldehydes to the corresponding olefinic alcohols.

In practising this invention, the synthesis can be carried out in separate steps with isolation and purification of the intermediates if desired. In preferred embodiments, one or more of the steps are combined or carried out in a single reaction mixture as described more fully hereinafter and it will be understood that all such embodiments are within the scope of the invention. In either case, various mechanisms may be advanced to explain the observed results without changing the operative steps set out.

As an initial step in the synthesis, an acetal of acetoacetaldehyde is condensed with acetylene to form an acetylenic carbinol. The condensation is carried out in the presence of a suitable condensation catalyst such as lithium amide, sodamide, potassium amide, calcium amide, or a catalyst complex of potassium hydroxide and a solvent having two ether-oxygen atoms separated by one or two carbon atoms, such as acetals, ketals or dialkyl ethers of ethylene glycols, as for example acetaldehyde dipropyl acetal as prepared by the method of Weizmann set out in U. S. Patent 2,472,135. The condensation is desirably effected in liquid ammonia at lowered temperatures for ready control of the reaction. Acetylene gas is bubbled through the reaction mixture and when alkali or alkaline earth amide is employed, the acetylene condenses as the acetylide. Any of the open or cyclic acetals of acetoacetaldehyde can be employed since the acetal group serves only to protect the aldehydic carbonyl group and does not enter into nor affect the course of this or subsequent reactions, the acetal group being subsequently hydrolyzed to an aldehyde group. For convenience, the dialkyl acetals of acetoacetaldehyde such as the dimethoxy, diethoxy, dipropoxy or dibutoxy acetals are desirably employed although aryl, aralkyl or mixed acetals can be employed as well as cyclic acetals as prepared from a glycol such as ethylene or propylene glycol or the like.

The condensation of acetylene with an acetal of acetoacetaldehyde is illustrated by the following equation of the condensation of a dialkyl acetal of acetoacetaldehyde with acetylene, R and R' being alkyl radicals:

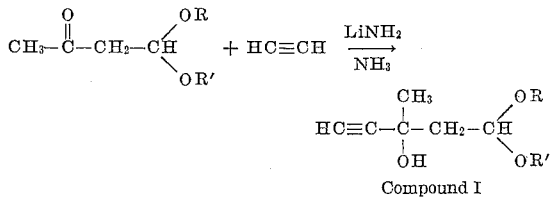

*Equation I*

The acetylenic carbinol, compound I, is thereafter condensed with the aldehyde, 2-methyl-4-(2,6,6-trimethyl cyclohex-2-ene-1-ylidene)-buta-2-ene-1-al, by means of a Grignard reaction with an alkyl magnesium halide to form an acetylenic 3,6-diol acetal. The condensation is effected in accordance with the usual practices for Grignard type reactions using such well-known Grignard reagents as ethyl magnesium bromide, methyl magnesium iodide or the like; the Grignard reagent, RMgX, desirably being formed in situ by means of magnesium and an alkyl halide. The condensation of the acetylenic carbinol, compound I, with the aldehyde is illustrated by the following equation wherein R and R' are alkyl radicals and X is a halogen atom:

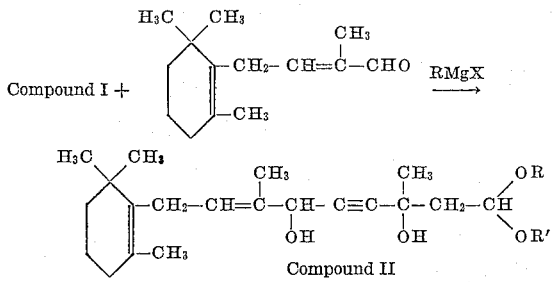

*Equation II*

The acetylenic 3,6-diol acetal, compound II, is then converted to the corresponding olefinic 3,6-diol acetal by partial hydrogenation of the acetylenic linkage. The partial hydrogenation is readily effected by reacting approximately one molecular equivalent of hydrogen with the acetylenic 3,6-diol acetal in the presence of a hydrogenation catalyst such as palladium, Raney nickel or similar well-known hydrogenation catalyst, the hydrogenation proceeding effectively at atmospheric pressure although slightly elevated pressures can be employed if desired. The hydrogenation is illustrated by the following equation:

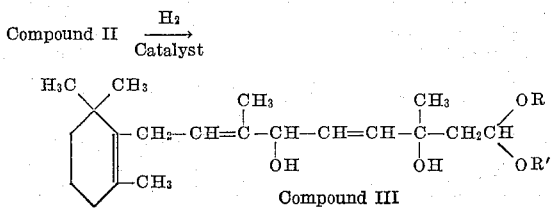

*Equation III*

The olefinic 3,6-diol acetal, compound III, is thereafter converted to vitamin A-active material, preferably by converting the olefinic 3,6-diol acetal to vitamin A aldehyde and reducing the vitamin A aldehyde to vitamin A alcohol. The conversion to vitamin A alcohol necessarily includes dehydration, hydrolysis, treatment with a basic material and reduction of the olefinic 3,6-diol acetal and the conversion can be effected in a series of separate steps or in combinations of steps.

For purposes of illustration, a sequential conversion of the olefinic 3,6-diol acetal is delineated graphically, certain combinations of steps and preferred embodiments being described more fully hereinafter. Compound III or similar olefinic 3,6-diol acetal is dehydrated and partially cleaved to an enol ether by treatment with a phosphorous halide or oxyhalide, preferably in combination with pyridine or a similar tertiary amine. The reaction proceeds at room temperature or at elevated temperatures, the reaction time depending upon the temperature employed, the concentration of reactants and similar variable conditions. The preparation of an enol ether is illustrated by the following equation wherein R is an alkyl radical:

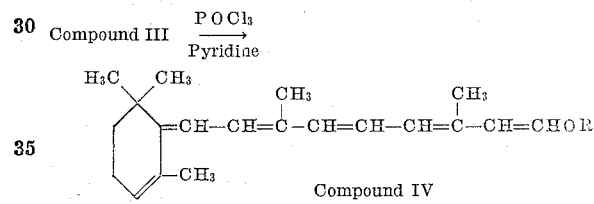

*Equation IV*

The enol ether, compound IV, is thereafter hydrolyzed with aqueous acid, dilute mineral acids such as hydrochloric acid, sulfuric acid or the like being preferred, to form a compound V for which the structure set out in Equation V has been postulated, the reaction being illustrated as follows:

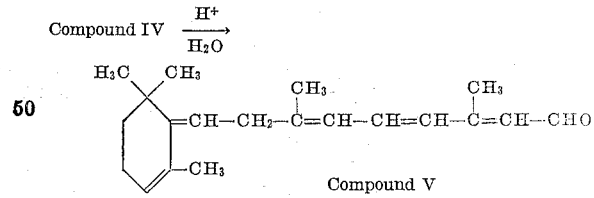

*Equation V*

In an alternative embodiment, the olefinic 3,6-diol acetal is dehydrated and hydrolyzed to compound V, in a single reaction mixture by treating compound III with mineral acid in acetone or similar organic solvent.

Compound V is readily rearranged to vitamin A aldehyde by treating compound V with a basic catalyst, desirably in solvent solution. Any of the well-known basic materials are effective to catalyze the rearrangement which proceeds at room temperature or at elevated temperatures. Typical basic materials which catalyze the rearrangement include inorganic bases such as sodium hydroxide, potassium hydroxide and the like, basic salts such as potassium acetate, sodium acetate and the like, organic bases such as pyridine, quinoline, lutidine, picolines, aniline, piperidine and the like, alkaline soaps, basic adsorbents such as sodium aluminum silicate and the like, and similar well-known materials of basic character. The amount of basic material necessary to catalyze the rearrangement is not critical and trace amounts are sufficient although larger amounts can be employed without deleterious effects.

The vitamin A aldehyde is then reduced to vitamin A alcohol by means of an ether-soluble metal hydride such as lithium aluminum hydride, lithium borohydride, or the like, or by means of an aluminum alkoxide such as aluminum isopropoxide, aluminum tert.-butoxide or similar well-known alkoxide together with the corresponding monohydric alcohol, or by similar method of reducing an olefinic aldehyde to an olefinic alcohol.

In a preferred embodiment, rearrangement, of the compound V, to vitamin A aldehyde and concomitant reduction of the vitamin A aldehyde to vitamin A alcohol in a single reaction mixture is effected by treating compound V with a basic reducing agent, both the ether-soluble basic metal hydride and the aluminum alkoxides being suitably employed for this purpose, as well as other well-known basic reducing agents.

In another preferred embodiment, conversion of the olefinic 3,6-diol acetal to vitamin A aldehyde in a single reaction step is effected by treating the olefinic 3,6-diol acetal, compound III, with a mixture of an ionizable acid and an organic base, the acid and base being added either as separate constituents or as an acid-organic base addition product. Any of the well-known ionizable acids can be employed, the mineral acids being preferred and the hydrohalic acids such as hydrochloric acid or hydrobromic acid being especially suitable. Similarly any of the well-known organic bases can be used such as pyridine, quinoline, piperidine, lutidine, aniline, picolines, morpholine and the like. For convenience the acid-base components can be added as a single compound such as an amine hydrohalide, typical examples being pyridine hydrochloride and quinoline hydrobromide.

Vitamin A alcohol as produced by processes embodying this invention is readily esterified by well-known esterification processes to form the corresponding esters such as the acetate or palmitate or similar ester, vitamin A commonly being sold commercially in the ester form.

The invention is illustrated by the following examples of preferred embodiments thereof. The ultra-violet absorption data (E values) in all of the examples were determined in ethanol.

EXAMPLE 1

A suspension of lithium amide in liquid ammonia was prepared in the usual manner from 6.94 g. of lithium metal and 800 ml. of liquid ammonia. Acetylene gas was then bubbled into this solution at a rapid rate for one hour with the solution maintained at −70° to −80° C. The addition of acetylene was then continued at a slow rate and 66.2 g. of dimethyl acetal of acetoacetaldehyde dissolved in 150 ml. of absolute ether was added over a period of 15-20 minutes. The reaction mixture was allowed to stand for 3 hours during which time the temperature was allowed to rise slowly so that the liquid ammonia gradually evaporated. Acetylene gas was bubbled into the solution during the first hour of this period and then discontinued. The ammonia was cautiously removed by evaporation, the volume of the reaction mixture being maintained by the addition of absolute ether. The reaction mixture was then diluted with about 300 ml. of saturated ammonium chloride solution, the ether phase separated from the aqueous phase and the aqueous phase extracted with ether. The combined ether phases were dried over anhydrous sodium sulfate and the solvent removed by evaporation. The crude product was fractionated by vacuum distillation to give 39.0 g. of the acetylenic carbinol, 1,1-dimethoxy-3-methyl-3-hydroxy-4-pentyne (compound I) having B. P. 69–70° at 9 mm. Hg and $n^{27.5}$ 1.4415.

EXAMPLE 2

A solution of 24.0 g. of 1,1-dimethoxy-3-methyl-3-hydroxy-4-pentyne in 75 ml. of absolute ether was added dropwise over a period of 45 minutes to 122 ml. of ethyl magnesium bromide ethereal solution (1.317 mole). The mixture refluxed during such addition and was heated at reflux for 195 minutes following the addition. The mixture was then cooled and maintained at −5° to −10° C. under nitrogen and a solution of 31.14 g. of 2-methyl-4-(2,6,6-trimethyl cyclohex-1-enyl) buta-2-ene-1-al in 75 ml. of absolute ether was added dropwise over a 1 hour period. The resulting reaction mixture was stirred and refluxed for 165 minutes resulting in the formation of a light yellow solution. The magnesium complex was decomposed by the addition of saturated ammonium chloride solution to the cooled reaction mixture. The ether phase was separated from the aqueous phase, the aqueous phase saturated with sodium chloride and extracted with ether, and the ether phases combined. The combined ether phases were dried over anhydrous sodium sulfate, the ether removed by evaporation, and the residue heated to 60–80° C. at a pressure of about 3 mm. Hg to give 50.2 g. of crude product. The crude product was purified by chromatography on sodium aluminum silicate to give 35.5 g. of the acetylenic 3,6-diol acetal, 1,1-dimethoxy-3,6-dihydroxy-3,7-dimethyl - 9 - (2,6,6 - trimethyl cyclohex - 1 - enyl) nona-7-ene-4-yne (compound II) having $n^{25}$ 1.4950 and showing the acetylenic diol structure by infrared analysis.

EXAMPLE 3

A 1.0 g. portion of the acetylenic 3,6-diol dimethyl acetal (compound II) was dissolved in 20 g. of methanol and the resulting solution was mixed with 0.1 g. of 5% palladium-charcoal catalyst partially poisoned with quinoline. Hydrogen was passed through the reaction mixture for 45 minutes during which time 75.9 ml. of hydrogen was adsorbed (1.05 molecular equivalent). The methanol was then blown off by nitrogen. Infra red analysis showed substantially complete conversion of compound II to the corresponding olefinic 3,6-diol acetal, 1,1-dimethoxy - 3,6 - dihydroxy - 3,7 - dimethyl - 9 - (2,6,6-trimethyl cyclohex-1-enyl)-nona-4,7-diene (compound III).

EXAMPLE 4

To 23.5 ml. of pyridine was added 7.1 g. of phosphorous oxychloride in 35 ml. of absolute toluene followed by a solution in 16.0 ml. of toluene of 6.0 g. of 1,1-dimethoxy-3,6-dihydroxy-3,7-dimethyl-9-(2,6,6-trimethyl cyclohex-1-enyl) nona-4,7-diene (compound III). The resulting reaction mixture was heated to 90–95° C. for 90 minutes during which time the mixture was stirred vigorously. The reaction mixture was then cooled and stirred into 30 g. of crushed ice and ether. The aqueous phase was separated from the ether phase, and the aqueous phase re-extracted with ether. The combined ether extracts were washed successively with saturated potassium carbonate solution, excess 5% sulfuric acid, saturated sodium bicarbonate solution, and water. The extract was then dried over anhydrous sodium sulfate and the solvent removed by evaporation to give 4.48 g. of the enol ether, 1-methoxy - 3,7 - dimethyl - 9 - (2,6,6-trimethyl cyclohex-2-ene-1-ylidene)-nona - 1,3,5,7 - tetraene (compound IV) having $$E_{1\,cm.}^{1\%} (372m\mu) = 624$$

EXAMPLE 5

To a solution of 0.24 g. of the enol ether, compound IV, as prepared in the preceding example, dissolved in 5 ml. of acetone was added 1 drop of concentrated hydrochloric acid. The solution was refluxed for 15 minutes, the solvent was removed by evaporation, and the residue taken up in ether. The ether solution was washed with sodium bicarbonate solution and with water, dried over anhydrous sodium sulfate and the solvent removed by evaporation to give compound V having $$E_{1\,cm.}^{1\%} (328\ m\mu) = 577$$

EXAMPLE 6

Compound V, from the preceding example was taken up in petroleum ether and passed through a column of synthetic sodium aluminum silicate adsorbent. The basic adsorbent effected rearrangement of compound V to vitamin A aldehyde and 0.20 g. of vitamin A aldehyde was obtained having $$E_{1\,cm.}^{1\%} (374\ m\mu) = 815$$

EXAMPLE 7

To a solution of 0.63 g. of vitamin A aldehyde in 6.3 ml. of absolute ether was added 3.8 ml. of a 1 M. ethereal solution of lithium aluminum hydride diluted with 3.8 ml. of absolute ether, the addition being made in a 30 sec. period. The resulting mixture was stirred for 1 minute and excess hydride decomposed by the addition of wet ether followed by acetone and then 5% hydrochloric acid. The mixture was extracted with ether, the extract washed with sodium bicarbonate solution and with water, dried over anhydrous sodium sulfate and the solvent removed by evaporation. The product, vitamin A alcohol, was recovered in 86% yield and had $$E_{1\,cm.}^{1\%} (326\ m\mu) = 915$$

EXAMPLE 8

Simultaneous rearrangement and reduction of compound V in a single reaction step was effected by adding 3.8 ml. of a 1 M. ethereal solution of lithium aluminum hydride diluted with 3.8 ml. of anhydrous ether to 0.63 g. of compound V dissolved in 6.3 ml. of anhydrous ether. The hydride solution was added as rapidly as the vigor of the reaction would permit; and following the addition, the mixture was stirred for 1 minute. Thereupon the excess hydride was decomposed with wet acetone, the mixture was extracted with ether and the ether extract was washed successively with sodium bicarbonate solution and water. The extract was dried over anhydrous sodium sulfate and the solvent removed by evaporation to give a vitamin A alcohol concentrate having $$E_{1\,cm.}^{1\%} (328\ m\mu) = 566$$

EXAMPLE 9

To a suspension of 1.35 g. of aluminum isopropoxide in 10 ml. of isopropyl alcohol was added 0.61 g. of compound V dissolved in 25 ml. of isopropyl alcohol. The resulting reaction mixture was refluxed until the distillate gave a negative acetone test with 2,4-dinitrophenyl hydrazine. The excess alcohol was then distilled off under vacuum, the residue was cooled and the excess aluminum isopropoxide was decomposed by the addition of 20 ml. of 10% sulfuric acid. The mixture was extracted with ether, the extract washed to neutrality with water, and the ether removed by evaporation to give a vitamin A alcohol concentrate having $$E_{1\,cm.}^{1\%} (328\ m\mu) = 690$$

EXAMPLE 10

The conversion of an olefinic diol acetal, corresponding to compound III, to vitamin A aldehyde in a single reaction step is readily effected with an ionizable acid and an organic base. In a typical example, 1.0 g. of a diol acetal dissolved in 8 cc. of methyl ethyl ketone and mixed with a solution of 0.11 g. of quinoline and 0.12 g. of concentrated hydrochloric acid in 6 cc. of methyl ethyl ketone. The resulting mixture was refluxed for 2 hours and the product obtained was a vitamin A aldehyde concentrate having the characteristic $\lambda$ max. $= 372\ m\mu$.

EXAMPLE 11

A 1.0 g. portion of compound V, having $$E_{1\,cm.}^{1\%} (328\ m\mu) = 794$$

was dissolved in 5 cc. of benzene containing 10 drops of pyridine. The mixture was allowed to stand overnight at room temperature and the product obtained thereby was vitamin A aldehyde having $\lambda$ max. $= 370\ m\mu$.

EXAMPLE 12

An 0.8 g. portion of compound V was dissolved in 6 cc. of ethanol and 9 drops of 0.5 N potassium hydroxide solution were added thereto. The resulting mixture was allowed to stand at room temperature for 3 hours, extracted with ether, the extract washed with water and dried over sodium solution, and the ether removed by evaporation to give a vitamin A aldehyde concentrate having $$E_{1\,cm.}^{1\%} (370\ m\mu) = 527$$

Thus, by means of this invention, vitamin A is successfully synthesized without the difficulties normally attendant to vitamin A syntheses involving formation of hydroxy compounds.

Although the invention has been described in considerable detail with reference to certain preferred embodiments, it will be understood that variations and modifications can be effected within the spirit and scope of the invention as described hereinabove and as defined in the appended claims.

I claim:

1. A 3,6-diol acetal of the formula

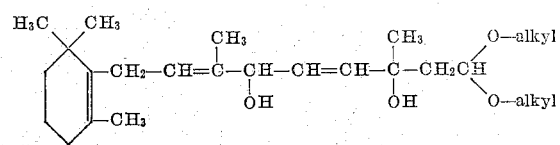

2. A 3,6-diol acetal of the formula

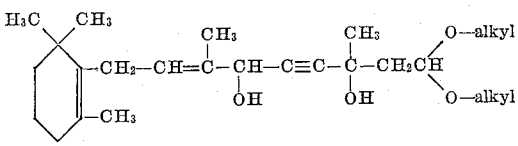

3. The method which comprises condensing an acetal of acetoacetaldehyde with acetylene and thereby forming an acetylenic carbinol, condensing said acetylenic carbinol with the aldehyde, 2-methyl-4-(2,6,6-trimethyl cyclohex-1-enyl)-buta-2-ene-1-al, and thereby forming an acetylenic 3,6-diol acetal, hydrogenating said acetylenic 3,6-diol acetal to the corresponding olefinic 3,6-diol acetal, dehydrating and hydrolyzing said olefinic 3,6-diol acetal to an aldehydic material.

4. In the synthesis of vitamin A, the method of making an olefinic 3,6-diol acetal which is convertible to vitamin A by dehydration, hydrolysis and reduction which comprises condensing an acetal of acetoacetaldehyde with acetylene and thereby forming an acetylenic carbinol, condensing said acetylenic carbinol with the aldehyde, 2-methyl-4-(2,6,6-trimethyl cyclohex-1-enyl)-buta-2-ene-1-al, and thereby forming an acetylenic 3,6-diol acetal, and partially hydrogenating said acetylenic 3,6-diol acetal to the corresponding olefinic 3,6-diol acetal.

5. The method of making vitamin A which comprises condensing an acetal of acetoacetaldehyde with acetylene and thereby forming an acetylenic carbinol, condensing said acetylenic carbinol with the aldehyde, 2-methyl-4-(2,6,6-trimethyl cyclohex-1-enyl)-buta-2-ene-1-al, and thereby forming an acetylenic 3,6-diol acetal, hydrogenating said acetylenic 3,6-diol acetal to the corresponding olefinic 3,6-diol acetal, dehydrating and hydrolysing said olefinic 3,6-diol acetal to an aldehydic material, and treating said aldehydic material with a basic reducing agent and thereby forming vitamin A alcohol.

6. The method of making vitamin A which comprises condensing an acetal of acetoacetaldehyde with acetylene and thereby forming an acetylenic carbinol, condensing said acetylenic carbinol with the aldehyde, 2-methyl-4-(2,6,6-trimethyl cyclohex-1-enyl)-buta-2-ene-1-al, and thereby forming an acetylenic 3,6-diol acetal, hydrogenating said acetylenic 3,6-diol acetal to the corresponding olefinic 3,6-diol acetal, treating said olefinic 3,6-diol acetal with an ionizable acid and an organic base and thereby forming vitamin A aldehyde, and reducing said vitamin A aldehyde to vitamin A alcohol.

7. The method of making vitamin A which comprises reacting a dialkyl acetal of acetoacetaldehyde with an acetylide and thereby forming an acetylenic carbinol of the formula

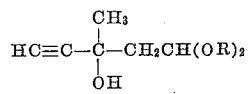

wherein R is an alkyl radical, condensing said acetylenic carbinol with an aldehyde of the formula

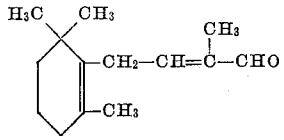

and thereby forming an acetylenic 3,6-diol acetal of the formula

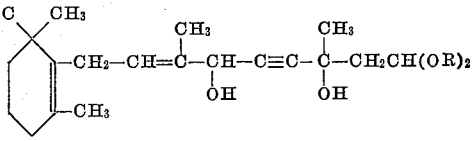

partially hydrogenating the acetylenic linkage of said acetylenic 3,6-diol acetal and thereby forming the corresponding olefinic 3,6-diol acetal, dehydrating said olefinic 3,6-diol acetal and hydrolyzing the acetal group to an aldehydic group by means of an ionizable acid, and reducing the resulting aldehydic product to vitamin A alcohol with a basic reducing agent.

References Cited in the file of this patent

UNITED STATES PATENTS

| Number | Name | Date |
|---|---|---|
| 2,577,538 | Milas | Dec. 4, 1951 |
| 2,586,305 | Copenhaver | Feb. 19, 1952 |
| 2,586,306 | Copenhaver | Feb. 19, 1952 |
| 2,615,922 | Starke | Oct. 28, 1952 |

Heilbron, J. Chem. Soc. (England), Mar. 1948, pp. 386–393.

Milas et al., J. Amer. Chem. Soc., vol. 70, pp. 1597–1607.